July 19, 1938.  A. T. PETERSON  2,123,961

DOUBLE ACTING SHOCK ABSORBER

Filed May 21, 1937

Alfred T. Peterson.
INVENTOR.

BY Howard Fiske
ATTORNEYS.

Patented July 19, 1938

2,123,961

UNITED STATES PATENT OFFICE 2,123,961

DOUBLE ACTING SHOCK ABSORBER

Alfred T. Peterson, St. Paul, Minn., assignor of one-half to Hugh V. Mercer, Minneapolis, Minn.

Application May 21, 1937, Serial No. 143,969

7 Claims. (Cl. 280—96.2)

My invention relates to a novel type of shock absorber wherein it is desired to provide a device operable to absorb shock transmitted through a vehicle wheel to prevent this movement from being transmitted to the frame of the car.

Many types of shock absorbers have been utilized previously for this purpose. However, the majority of these constructions disclose vertically disposed spring means or means for preventing too sudden movement of the wheel, thus dampening the shock. While some of these former shock absorbers are entirely suitable for the purpose for which they are designed, it is desired in the present application to provide a construction which is simpler and which is less costly than other types of shock absorbers.

It is a purpose of my invention to provide a means of absorbing shock in either direction, that is when the vehicle wheel adjacent which the device is attached passes over a bump or projection in the road or if it passes over a hole in the road. Shock in either way is absorbed whether the vehicle is traveling in one direction or the other.

It is a purpose of my invention to mount the axle of the vehicle directly to a member pivotally mounted with respect to the wheel, and to dampen pivotal movement of this member by means of springs or spring cushion members. All of the movement transmitted from the wheel to the axle must accordingly pass through this pivotal connection which therefore has an opportunity to dampen all vibrations.

It is a purpose of my invention to pivotally secure the ends of the axle to a plate which is pivotally mounted along a horizontal axis which may coincide with the axis of the wheel. Cushion or spring means are provided to resist movement of the plate and to normally hold the wheel in a predetermined position relative to the axle. As the wheel passes over a projection or irregularity in the road, the sudden impact tends to twist the plate secured to the axle into engagement with one of the cushion or spring means tending to compress this cushion or spring.

These and other objects and novel features of my invention will be more clearly and fully set forth in the following specification and claims.

In the drawing forming a part of my specification:

Figures 1, 2:
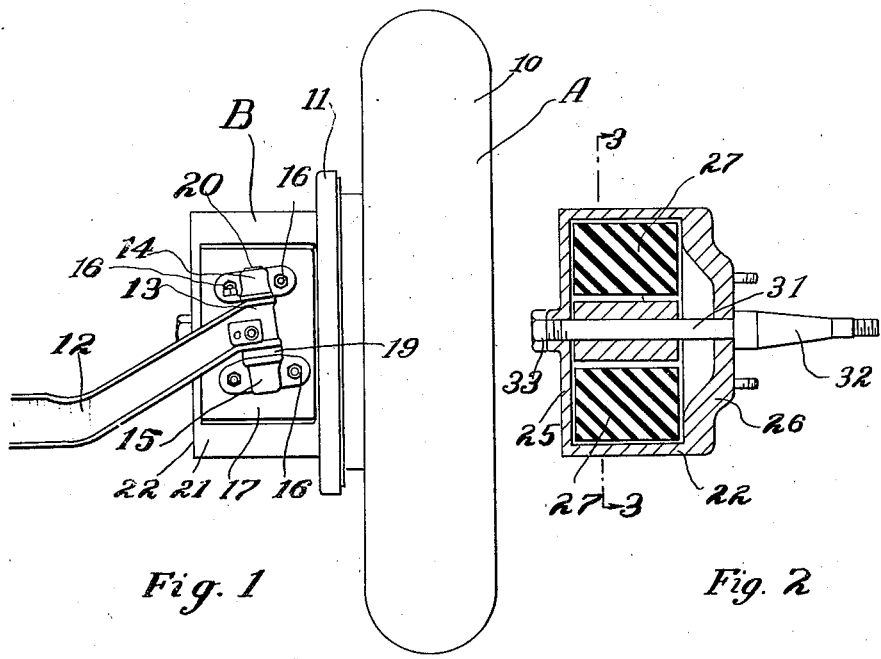
Figure 1 is a front elevation view of a vehicle wheel having the steering mechanism removed therefrom for the purpose of clarifying the illustration.
Figure 2 is a vertical cross-sectional view centrally through the device illustrated in Figure 1.

The automobile wheel 10 of the vehicle A is provided with a brake drum 11 to which the shock absorber B is secured. The shock absorber B connects the wheel 10 with the axle 12 of the vehicle. As shown in Figure 1, the axle 12 is provided with a journal 13 at each extreme end thereof, which extends between spaced aligned bearings 14 and 15 secured by bolts 16 to the plate 17 forming a part of the shock absorber B. A thrust bearing 19 is interposed between the axle 12 and the bearing 15 surrounding the pivot pin 20, to support the weight of the vehicle with a minimum of friction.

Figures 3, 4:
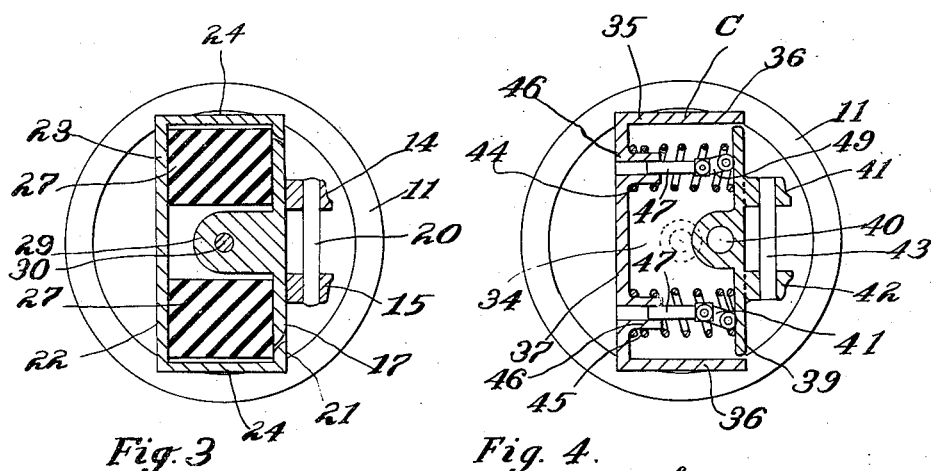
Figure 3 is a cross-sectional view as the device would appear cut along the line 3—3 of Figure 2.
Figure 4 illustrates a view similar to Figure 3, showing a slightly different form of construction.

The aligned bearings 14 and 15 as illustrated in Figure 1, are at a slight angle to the vertical in usual construction, but in order to simplify the construction and illustration the vertical sections Figures 3 and 4, illustrate the bearings 14 and 15 and the pin 20 as though this pin 20 extends vertically.

The plate 17 forms a part of one wall 21 of the box 22 forming the casing of the shock absorber B. The casing or box 22 comprises a front wall 21, a rear wall 23, top and bottom walls 24, and side walls 25 and 26. The side wall 26 is preferably shaped to fit the contour of the outside of the brake drum 11 of the vehicle so that the casing 22 may be bolted directly thereto.

Interposed between the plate 17 and the rear wall 23 of the casing 22, I provide cushions 27 formed of resilient material. The plate 17 is provided with an inwardly extending lug 29 which is drilled at 30 to accommodate a pivot pin 31 which in the form illustrated is shown as an integral part of the wheel spindle 32. The spindle 32 and integral pivot pin 31 are held in position by a nut 33 as may be best seen in Figure 2 of the drawing.

When a shock is transmitted to the wheel 10 of the vehicle A, this shock is transmitted through the brake drum 11 to the wall 26 of the casing 22. The vehicle supported upon the axle 12 tends to maintain an even plane while the casing 22 tends to move upwardly or downwardly. This creates a twisting strain between the axle 12 supported on the pin 20 of the plate 17, and the casing 22 of the shock absorber, thereby pivoting the lug 29 and integral plate 17 upon the pivot 30. Pivotal movement of the plate 17 in either direction about the pivot 30 compresses either one or the other of the resilient cushions 27 which act to force the plate 17 into the normal position illustrated in Figure 3, when the strain has ceased. It will be understood that the cushions 27 are normally under some compression and because of the weight of the vehicle, the upper cushion in the housing 22 may be more strongly resistant to compression than the lower cushion.

Figure 4 illustrates a slightly different form of construction. In this construction the shock absorber C is secured to the brake drum 11 in a manner illustrated in Figures 1 and 2, the side 34 of the casing 35 being shaped similar to the side 26 of the casing 22. The casing 35 of the shock absorber C comprises top and bottom plates 36 and a rear plate 37. The front side of the casing 35 is closed by a plate 39 and is transversely pivoted at 40 to a pivot pin extending transversely between the opposite side walls of the casing 35. Aligned bearings 41 and 42 similar to the bearings 14 and 15 of the shock absorber B, are provided on the plate 39 to accommodate a suitable pivot pin 43 upon which the axle of the vehicle is pivoted.

Interposed between the front pivot plate 39 and the rear plate 37 of the casing or housing 35, I provide springs 44 and 45. These springs are held in position upon bosses 46 on the rear plate 37, and are held in proper alignment by rods 47 slidable in the bosses 46 and which are pivotally connected by links 49 to the pivoted plate 39. Pivotal movement of the plate 39 with respect to the casing 35 when the vehicle passes over an uneven portion of the road, tends to compress either the spring 44 or the spring 45 momentarily, and the spring then returns the plate 39 to normal position. As in the previous type of construction, the spring 44 may be more strongly resistant than the spring 45 if desired, in order to better withstand the weight of the vehicle which ordinarily would tend to compress the spring 44.

In accordance with the patent statutes, I have described the principles of construction of my double acting shock absorber, and while I have endeavored to set forth the best embodiments thereof, I desire to have it understood that this is only a means of carrying out my invention and that obvious changes may be made within the scope of the following claims without departing from the spirit of my invention.

I claim:

1. A shock absorber for vehicle wheels comprising, a casing secured to the wheel spindle of a vehicle, a plate pivotally secured to the axle of the vehicle and pivotally secured to said casing on an axis extending transversely with respect to the direction of travel of the vehicle, and resilient means resisting a pivotal movement between said plate and said casing.

2. A shock absorber for vehicles comprising, a casing secured to the wheel spindle of a vehicle, a plate pivotally secured to the end of the axle of a vehicle, said plate being pivotally supported in said casing along an axis extending transversely with respect to the direction of travel of the vehicle, and resilient means interposed between said plate and said casing to resist pivotal motion in either direction with respect to said casing.

3. A shock absorber for vehicles comprising, a member secured to a vehicle wheel spindle, said member extending transversely with respect to the direction of vehicle travel, a second transverse member normally substantially parallel to said first transverse member pivotally secured with respect to said vehicle wheel spindle, means pivotally securing said second transversely extending member to the axle of the vehicle, and resilient means interposed between said first and second transversely extending members to resist relative pivotal movement therebetween.

4. A double acting shock absorber comprising, a vertically extending plate secured to a wheel spindle of the vehicle in a plane parallel to the axis of the wheel, a second vertically extending plate extending in a plane parallel the axis of the wheel, and means pivotally securing said second named plate to said wheel spindle and to the axle of the vehicle, and means interposed between said plates to resist relative pivotal movement between said plates.

5. A double acting shock absorber for vehicles comprising, a box like casing secured to a wheel spindle of the vehicle, an open face in said casing, a plate pivoted intermediate the ends thereof in the open side of said casing, said pivot means connecting said plate and casing extending on a transverse axis with respect to the direction of travel of the vehicle, and resilient means interposed between the ends of said pivotally mounted plate and said casing to permit, but to resist considerable pivotal movement of said plate.

6. A double acting shock absorber for a vehicle comprising, a plate means pivotally connected to the end of a vehicle axle, means on said plate pivotally connecting said plate to the vehicle wheel spindle in alignment with the axis thereof, and means for resisting pivotal movement of said plate with respect to said wheel spindle.

7. A double acting shock absorber for vehicles comprising, means pivoted along an axis transverse with respect to the direction of vehicle travel to a wheel spindle of the vehicle, means pivotally connecting an axle of said vehicle to said first named means, and means interposed between said first named means and said wheel spindle to resist pivotal movement of said first named means in either direction.

ALFRED T. PETERSON.